3,480,602
POLYMERISATION PROCESS
Malcolm James Abercrombie, Dinas Powis, Glamorgan, and David B. Thomas, Cardiff, Glamorgan, Wales, assignors to British Geon Limited, London, England, a British company
No Drawing. Filed Sept. 1, 1965, Ser. No. 484,465
Claims priority, application Great Britain, Sept. 10, 1964, 37,050/64
Int. Cl. C08f 1/11, 3/30, 15/30
U.S. Cl. 260—87.1    4 Claims

ABSTRACT OF THE DISCLOSURE

Vinyl chloride homopolymers or copolymers with vinyl acetate having improved bulk densities and improved powder flow properties are prepared by suspension polymerising 70 to 100 parts by weight of vinyl chloride and 30 to 0 parts by weight of vinyl acetate in an aqueous medium containing hydroxyethyl cellulose having a viscosity in the range of 10 to 10,000 cps., as measured on a 1% w./w. aqueous suspension at 23° C. on a Brookfield viscometer, as suspension stabilizer and in the presence of an oil soluble polymerisation initiator.

---

The present invention relates to the production of polymers, and in particular to the production of vinyl chloride homopolymers and copolymers with vinyl acetate, having improved bulk densities and improved powder flow properties.

Many processes are available for the production of homopolymers of vinyl chloride and of copolymers of vinyl chloride with vinyl acetate. In general, however, these processes yield polymers which as unplasticised powders have relatively low bulk densities and which do not flow readily. For certain applications of the polymers, e.g., in the production of gramophone records, high density and, in particular, good flow properties of the unplasticised resin are very desirable.

The surprising discovery has now been made that if, in suspension polymerisation of vinyl chloride or vinyl chloride with vinyl acetate, hydroxyethyl cellulose of a specified viscosity is employed as stabilising agent, resins which in unplasticised form have improved density and flow properties, may be obtained.

Accordingly, the present invention is a process for the production of homopolymers or copolymers which comprises suspension polymerising 70–100 parts by weight of vinyl chloride, and 30–0 parts by weight of vinyl acetate in an aqueous medium containing hydroxyethyl cellulose of viscosity between 10–10,000 cps. (as hereinafter defined) as suspension stabiliser and in the presence of an oil soluble polymerisation initiator.

The invention further includes the resins produced by this novel process.

The term "suspension polymerisation" is used in its normal sense throughout this specification to mean a process in which polymerisation takes place in a simple physical suspension of drops which will coalesce rapidly when agitation ceases and which form polymer particles which settle rapidly when agitation ceases.

The vinyl chloride or vinyl chloride/vinyl acetate mixture is normally suspended in the aqueous medium by mechanical agitation, and the ratio of the organic to aqueous phase can vary widely as is customary in suspension polymerisation processes. Preferably, however, the ratio of the aqueous phase to the monomer phase lies in the range of 1.5:1 to 5:1 by weight.

Any water-soluble hydroxyethyl cellulose with a viscosity in the range 10–10,000 cps. may be used. Viscosities quoted here and throughout the specification are taken as measured on a 1% aqueous solution at 23° C. using a Brookfield viscometer. It is preferred to use a hydroxyethyl cellulose with a viscosity in the range 100–5,000 cps., and particularly in the range 200–3,000 cps.

The amount of suspension stabiliser used may vary widely, but generally concentrations between 0.05–3% by weight of the monomer present are found suitable. It is preferred to use about 0.1 to 1% by weight on monomer.

Suitable oil-soluble polymerisation initiators include, for example, caprylyl peroxide, lauroyl peroxide and benzoyl peroxide. The initiator may be employed in the usual concentration for suspension polymerisation for example in the range 0.1–1.0% by weight of the monomer present.

The temperature of the polymerisation can be varied but is suitably in the range 40 to 75° C.

The polymer or copolymer produced according to the process of the present invention is readily recovered from the reaction mixture, for example, by filtration or centrifugation. The polymer can be washed with water and is then directly recovered in a very pure state. The polymers or copolymers produced according to the process of the present invention have high bulk densities and flow very readily.

The invention is further illustrated by the following examples:

Example 1

A stainless steel pressure reactor of 15 gallon capacity equipped with a mechanical agitator and jacket for heating and cooling was charged with 45.4 kg. demineralised water, 2.54 kg. vinyl acetate, 39.8 g. caprylyl peroxide, 4230 g. of a 3% aqueous solution of a hydroxy ethyl cellulose (commercially available as Cellosize WP4400 and having a Brookfield viscosity as a 1% aqueous solution at 23° C. of approx. 300 cps.) and 950 g. of a 5% aqueous solution of sodium bicarbonate. To the sealed evacuated reactor was charged 10.16 kg. vinyl chloride. The agitated components were heated to 62° C. and maintained at this temperature until the reaction pressure of 115 p.s.i.g. had fallen to 35 p.s.i.g. which was approximately after 5 hours. The copolymer was then recovered.

The isolated unplasticised copolymer powder had a bulk density of 0.75 gm./ml. and an angle of repose of 28°. The angle of repose is a measure of the flow properties of the powder and is measured in the usual way by pouring the resin between two parallel vertical glass plates to form a triangular heap. The angle of repose is the angle formed between the side of the heap and the horizontal.

Example 2

In comparison gelatine was used as dispersant in preparing a similar copolymer as follows:

41.74 kg. demineralised water, 2.54 kg. vinyl acetate, 39.8 g. of caprylyl peroxide, 4460 g. of a 0.5% aqueous solution of gelatin and 4770 g. of a 1% aqueous solution of sodium bicarbonate were charged to the 15 gallon pressure vessel. To the sealed evacuated reactor was charged 10.16 kg. of vinyl chloride. The agitated components were heated to 62° C. and maintained at this pressure until the reaction pressure of 115 p.s.i.g. had fallen to 35 p.s.i.g.

The isolated unplasticised copolymer had a bulk density of 0.62 gm./ml. and an angle of repose of 35°. The latter figure indicates an inferior flow property compared with the powder produced in Example 1.

We claim:
1. A process for the production of homopolymers of vinyl chloride and copolymers of vinyl chloride and vinyl acetate of high bulk density and improved flow properties which comprises suspension polymerizing 70–100 parts by weight of vinyl chloride and 30–0 parts by weight of vinyl acetate in an aqueous medium containing 0.05–3% by weight of a water soluble hydroxyethyl cellulose having a viscosity in the range of between 200 and 3,000 cps., as measured on a 1% w./w. aqueous solution at 23° C. on a Brookfield viscometer, as suspension stabilizer and in the presence of 0.1–1.0% by weight of an oil soluble polymerization initiator.

2. A process according to claim 1 wherein the hydroxyethyl cellulose is present in an amount of 0.1–1% by weight of monomer.

3. A process according to claim 1 wherein the oil soluble polymerization initiator is caprylyl peroxide, lauroyl peroxide or benzoyl peroxide.

4. A process according to claim 1 wherein the polymerization is effected at a temperature in the range of from 40° C. to 75° C.

References Cited

UNITED STATES PATENTS 2,979,492 4/1961 Grovernale et al.

FOREIGN PATENTS 1,285,616 1/1962 France.

HARRY WONG, JR., Primary Examiner

U.S. Cl. X.R.

260—92.8